United States Patent
Hermann et al.

(10) Patent No.: US 8,082,743 B2
(45) Date of Patent: Dec. 27, 2011

(54) BATTERY PACK TEMPERATURE OPTIMIZATION CONTROL SYSTEM

(75) Inventors: Weston Arthur Hermann, Palo Alto, CA (US); Scott Ira Kohn, Redwood City, CA (US); Kurt Russell Kelty, Palo Alto, CA (US); Vineet Haresh Mehta, Mountain View, CA (US); Jeffrey Brian Straubel, Menlo Park, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 532 days.

(21) Appl. No.: 12/381,986

(22) Filed: Mar. 18, 2009

(65) Prior Publication Data

US 2010/0212338 A1    Aug. 26, 2010

Related U.S. Application Data

(63) Continuation-in-part of application No. 12/378,909, filed on Feb. 20, 2009.

(51) Int. Cl.
  *G01K 13/00* (2006.01)
(52) U.S. Cl. .......................... 62/129; 62/244
(58) Field of Classification Search .......... 62/244, 62/118, 157, 129, 126; 700/205, 276, 299
  See application file for complete search history.

(56) References Cited

U.S. PATENT DOCUMENTS

| | | | | |
|---|---|---|---|---|
| 5,808,367 A * | 9/1998 | Akagi et al. | ................ | 290/40 C |
| 5,834,132 A | 11/1998 | Hasegawa et al. | | |
| 6,747,432 B2 * | 6/2004 | Yoshimura | ................ | 318/599 |
| 7,683,570 B2 * | 3/2010 | Krauer et al. | ................ | 320/104 |
| 7,918,296 B2 * | 4/2011 | Reddy | ................ | 180/68.3 |
| 2002/0043413 A1 | 4/2002 | Kimishima et al. | | |
| 2002/0043964 A1 * | 4/2002 | Saito et al. | ................ | 323/282 |
| 2003/0140643 A1 * | 7/2003 | Yoshimura | ................ | 62/186 |
| 2005/0168072 A1 * | 8/2005 | Saito et al. | ................ | 307/10.1 |
| 2008/0074819 A1 * | 3/2008 | Sasaki et al. | ................ | 361/91.5 |
| 2008/0148829 A1 * | 6/2008 | Bohman | ................ | 73/114.68 |
| 2008/0156406 A1 * | 7/2008 | Breed | ................ | 152/415 |
| 2008/0216567 A1 * | 9/2008 | Breed | ................ | 73/146.5 |
| 2009/0116161 A1 * | 5/2009 | Takahashi et al. | ................ | 361/100 |

FOREIGN PATENT DOCUMENTS

| | | |
|---|---|---|
| EP | 1 699 106 A2 | 9/2006 |
| GB | 2 416 745 A | 2/2006 |
| JP | 2004336832 | 11/2004 |

* cited by examiner

*Primary Examiner* — Mohammad Ali
(74) *Attorney, Agent, or Firm* — Patent Law Office of David G. Beck

(57) ABSTRACT

A method and apparatus for limiting the adverse effects of temperature on the electrical energy storage system (ESS) of an electric vehicle after the vehicle has been turned off are provided. In general, whether or not coolant is circulated through a coolant loop coupled to the ESS depends on the difference between the ambient temperature and a preset temperature, the preset temperature typically corresponding to the temperature of the ESS.

13 Claims, 12 Drawing Sheets

BATTERY PACK TEMPERATURE OPTIMIZATION CONTROL SYSTEM

CROSS-REFERENCE TO RELATED APPLICATION

This application is a continuation-in-part of U.S. patent application Ser. No. 12/378,909, filed Feb. 20, 2009, the disclosure of which is incorporated herein by reference for any and all purposes.

FIELD OF THE INVENTION

The present invention relates generally to electric vehicles and, more particularly, to a method and apparatus for efficiently controlling the temperature of the energy storage system in an electric vehicle.

BACKGROUND OF THE INVENTION

An extremely large percentage of the world's vehicles run on gasoline using an internal combustion engine. The use of such vehicles, more specifically the use of vehicles which rely on fossil fuels, e.g., gasoline, creates two problems. First, due to the finite size and limited regional availability of such fuels, major price fluctuations and a generally upward pricing trend in the cost of gasoline are common, both of which can have a dramatic impact at the consumer level. Second, fossil fuel combustion is one of the primary sources of carbon dioxide, a greenhouse gas, and thus one of the leading contributors to global warming. Accordingly, considerable effort has been spent on finding alternative drive systems for use in both personal and commercial vehicles.

Electric vehicles offer one of the most promising alternatives to vehicles that use internal combustion drive trains. To be successful, however, an electric vehicle must meet the consumers' expectations relative to performance, range, reliability, lifetime and cost. These expectations, in turn, place considerable importance on the design and configuration of the electric vehicle's rechargeable batteries since the batteries are currently one of the most expensive components associated with an electric drive train as well as one of the primary limitations to vehicle range. Furthermore, limited battery lifetime has a direct impact on long-term vehicle reliability, a problem that is clearly exacerbated by high battery replacement costs.

Accordingly, what is needed in the art is a means of extending the lifetime of a battery pack without incurring excessive additional costs. The present invention provides such a means.

SUMMARY OF THE INVENTION

The present invention limits the adverse effects of temperature on battery life, more specifically limiting the adverse effects of temperature on the electrical energy storage system (ESS) of an electric vehicle after the vehicle has been turned off. In accordance with the invention, whether or not coolant is circulated through a coolant loop coupled to the ESS depends, at least in part, on the difference between the ambient temperature and a preset temperature, the preset temperature typically corresponding to the temperature of the ESS.

In at least one embodiment of the invention, a thermal management system for an electric vehicle is disclosed, the system comprised of an ESS, a cooling system in thermal communication with the ESS, and a temperature control system, the temperature control system coupled to, and providing control over, the cooling system. The cooling system further comprises a coolant within a coolant loop, a coolant pump, and a radiator coupled to the coolant loop. The temperature control system includes a vehicle condition monitor for monitoring the on/off state of the vehicle, an ambient temperature monitor, a comparator circuit for comparing the ambient temperature with a preset temperature, and a cooling system controller for providing control signals to the cooling system based on the output from the comparator circuit. The system may further comprise an ESS temperature sensor, wherein the preset temperature may be set to the ESS temperature. The system may further comprise an ESS temperature sensor and a second comparator circuit for comparing the ESS temperature with a preset ESS target temperature, wherein the output from the cooling system controller may be based on the output from the second comparator circuit. The system may further comprise an ESS temperature sensor and multiple comparator circuits for comparing the ESS temperature with multiple preset ESS target temperature ranges, wherein the output from the cooling system controller may be based on the output from the multiple comparator circuits. The thermal management system may further comprise an independent refrigeration system and a heat exchanger in thermal communication with both the refrigeration system and the cooling system. The thermal management system may further comprise a heater in thermal communication with the coolant loop. The thermal management system may further comprise an SOC sensor, wherein the cooling system controller outputs a deactivation signal to the cooling system if the measured SOC is less than a preset target SOC. The ambient temperature monitor may comprise a temperature sensor or may comprise other means, such as a clock for providing local time, a global positioning system for determining vehicle location, and access to a data base, the data base providing temperature data as a function of local time and vehicle location. The coolant loop may further comprise a first portion of coolant loop in thermal communication with a first section of the ESS, a first valve for controlling coolant flow through the first coolant loop portion, a second portion of coolant loop in thermal communication with a second section of the ESS, and a second valve for controlling coolant flow through the second coolant loop portion. The temperature control system may comprise multiple comparators, and may comprise multiple ESS temperature sensors monitoring different ESS sections.

In at least one embodiment of the invention, a method of controlling the temperature of an ESS coupled to the electric powertrain of an electric vehicle is disclosed, the method comprising the steps of a) monitoring the operational condition of the vehicle and if the vehicle is in the off state, continuing the method with the steps of b) determining a current ambient temperature, c) comparing the current ambient temperature with a preset temperature, d) circulating coolant through the coolant loop of the ESS cooling system if the current ambient temperature is lower than the preset temperature, e) suspending coolant circulation if the current ambient temperature is greater than the preset temperature, and f) repeating steps b) through e). The method can further comprise the steps of determining a current ESS temperature and setting the preset temperature to the current ESS temperature. The method can further comprise the steps of determining a current ESS temperature, comparing the current ESS temperature with an ESS target temperature and suspending coolant circulation if the current ESS temperature is lower than the ESS target temperature. The method can further comprise the steps of determining a current ESS temperature, comparing the current ESS temperature with an ESS target temperature range, suspending coolant circulation if the current ESS temperature is lower than the ESS target temperature range, and circulating coolant through the ESS coolant loop and operating a refrigeration system if the current ESS temperature is greater than the ESS target temperature range. The method can further comprise the steps of determining a current ESS temperature, comparing the current ESS temperature with an ESS target temperature range, and circulating coolant through the ESS coolant loop and operating a heater if the current ESS temperature is lower than the ESS target temperature range. The method may further comprise the steps of determining a current SOC for the ESS, comparing the current SOC with a preset target SOC, and terminating ESS cooling if the current SOC is lower than the preset target SOC. The step of determining current ambient temperature may further comprise the step of monitoring at least one ambient temperature monitor, or may comprise the steps of determining local time/position and accessing a data base that provides ambient temperature as a function of local time/position. The coolant loop coupled to the ESS may comprise multiple sections and the method may comprise the steps of determining an ESS temperature corresponding to each coolant loop section, comparing the current ambient temperature with each section's ESS temperature, and circulating coolant through that section's coolant loop if the ambient temperature is lower than that section's ESS temperature.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different rechargeable cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The terms "energy storage system" and "ESS" may be used interchangeably and refer to an electrical energy storage system that has the capability to be charged and discharged such as a battery or battery pack. The term "EV" as used herein refers to an all-electric vehicle. The terms "hybrid", "hybrid electric vehicle" and "HEV" may be used interchangeably and refer to a vehicle that uses dual propulsion systems, one of which is an electric motor and the other of which is a combustion engine. The terms "plug-in hybrid vehicle" and "PHEV" may be used interchangeably and refer to a hybrid vehicle that can be plugged into an external power source, such as the power grid, in order to charge the on-board batteries. The term "electric vehicle" as used herein refers to an EV, HEV or PHEV. Lastly, identical element symbols used on multiple figures refer to the same component, or components of equal functionality.

Figure 1:
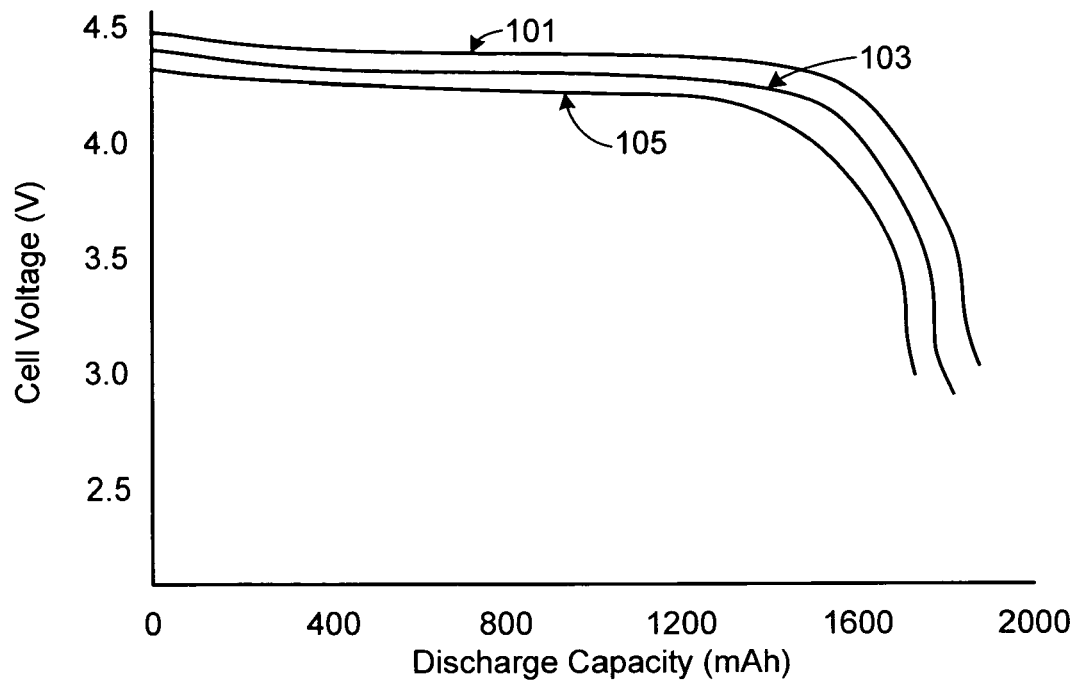
FIG. 1 graphically illustrates the effects of temperature on cell voltage and discharge capacity.
Figure 2:
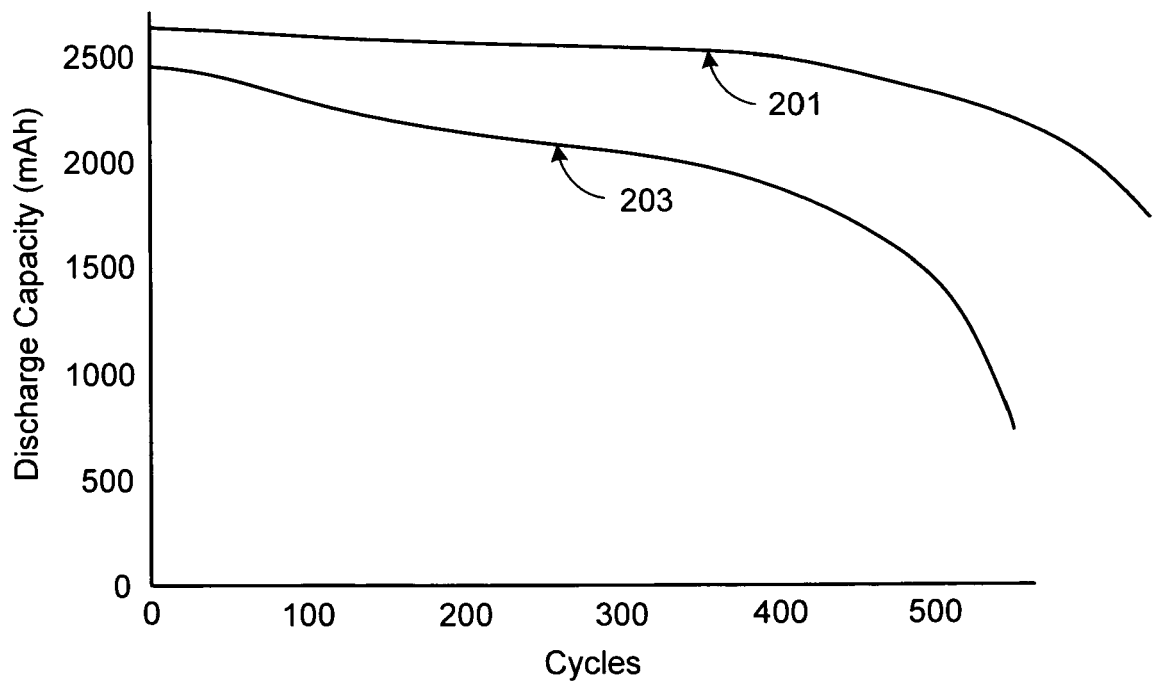
FIG. 2 graphically illustrates the effects of cycling temperature on battery capacity.
Figure 3:
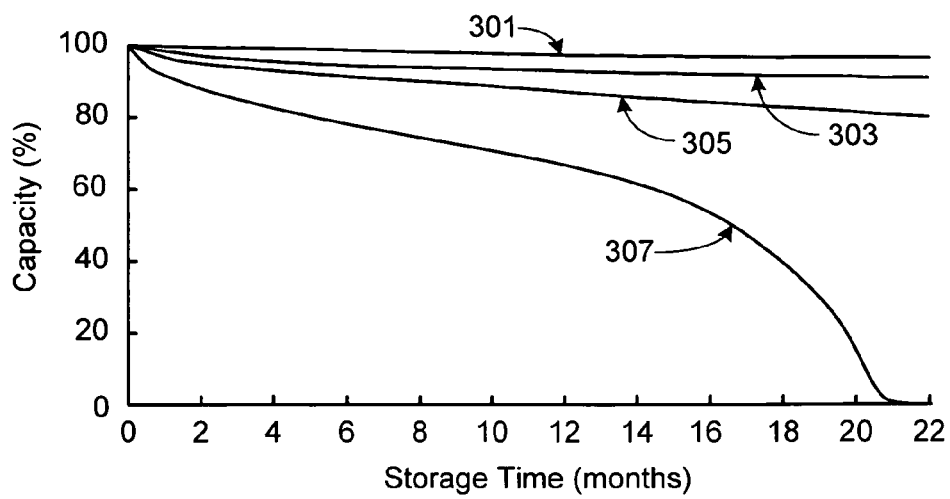
FIG. 3 graphically illustrates the effects of storage temperature on battery lifetime.

FIGS. 1-3 illustrate the adverse effects of temperature on battery performance. It should be understood that different battery packs, for example those using a different cell chemistry, will exhibit different profiles than those shown in FIGS. 1-3, and that these figures are only meant to be illustrative, not limiting.

FIG. 1 is a graph illustrating the effects of temperature on the cell voltage and discharge capacity of an exemplary battery. In the figure, curve 101 corresponds to a temperature of 40° C., curve 103 corresponds to a temperature of 30° C., and curve 105 corresponds to a temperature of 20° C. As illustrated, an increase in operating temperature from 20° C. to 40° C. dramatically improves discharge capacity which, in turn, can lead to improved driving range for an electric vehicle using such a battery pack. An increase in temperature also reduces the impedance which enables faster acceleration. A drawback, however, of operating at a higher temperature is the effect such a temperature has on battery life, specifically shortening the battery's life. Another adverse effect of higher temperatures is that a battery will typically exhibit higher non-recoverable capacity loss as the temperature is increased. This battery characteristic is illustrated in FIG. 2 in which curve 201 is for a battery pack cycled at 35° C. and curve 203 is for a battery pack cycled at 55° C. As shown, by decreasing the storage temperature of a battery, it is able to retain a much higher capacity over more cycles. This same effect is illustrated in a different way in FIG. 3 in which discharge capacity is graphed as a function of battery storage time. This figure shows that at a storage temperature of 0° C. there is very little degradation of battery life (curve 301); at a storage temperature of 20° C. there is a slightly more pronounced effect (curve 303); at a storage temperature of 40° C. the degradation of capacity is much more pronounced, although potentially acceptable for some applications (curve 305); while at a storage temperature of 60° C. battery life degradation is too rapid to be acceptable (curve 307) except for the most limited applications.

In order to limit the adverse effects of temperature on battery life after the vehicle has been turned off, i.e., after the key or other on/off control switch has been turned to the 'off' position, the system of the present invention determines the optimal cooling approach, taking into account ambient temperature. In the preferred embodiment of the invention, active cooling may continue even if the vehicle is not plugged into a recharging power source.

Figure 4:
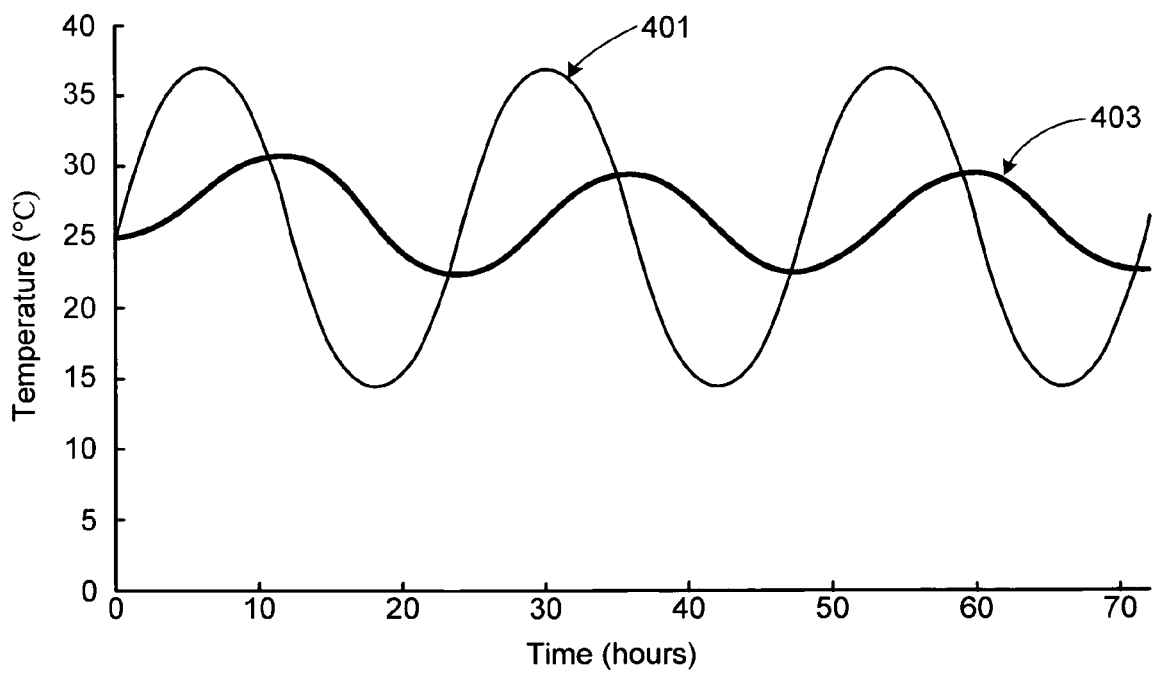
FIG. 4 graphically illustrates the variations in average ESS temperature versus ambient temperature.

The present invention is based on the recognition that the battery pack of a conventional electric vehicle typically has a relatively high thermal mass, making it resistant to ambient temperature changes. Accordingly, the inventors have found that in some instances circulating a coolant through the battery pack may be counter-productive since the flow of coolant throughout the battery pack overcomes the battery pack's resistance to temperature change, thereby causing the battery pack to more quickly reach an equilibrium temperature, the equilibrium temperature being potentially worse than would otherwise be achieved. This effect is illustrated in FIG. 4. Curve 401 represents the fluctuations in ambient temperature over a period of 3 days during the summer in a location in the western United States. As shown, the temperature varies between a high of 37° C. and a low of 14° C. Curve 403 represents the fluctuations in average battery pack temperature for a representative battery pack subjected to this environment. This curve assumes that at the beginning of the test the vehicle's active battery pack cooling system is turned off and at that point in time both the battery pack and ambient temperature are at 25° C. Curve 403 further assumes that no active battery pack cooling system is used throughout the course of the test. Due to its thermal mass, the average battery pack temperature only varies between a high of 30.5° C. and a low of 22.5° C. during the same period of time, thus clearly exhibiting an improved temperature history profile over ambient. Of course, as this profile is for an average temperature, it will be appreciated that it is important to monitor cell temperatures throughout the battery pack, thus insuring that all of the battery cells remain within the allowed temperature range, including those cells located near the outer battery pack surface.

Figure 5:
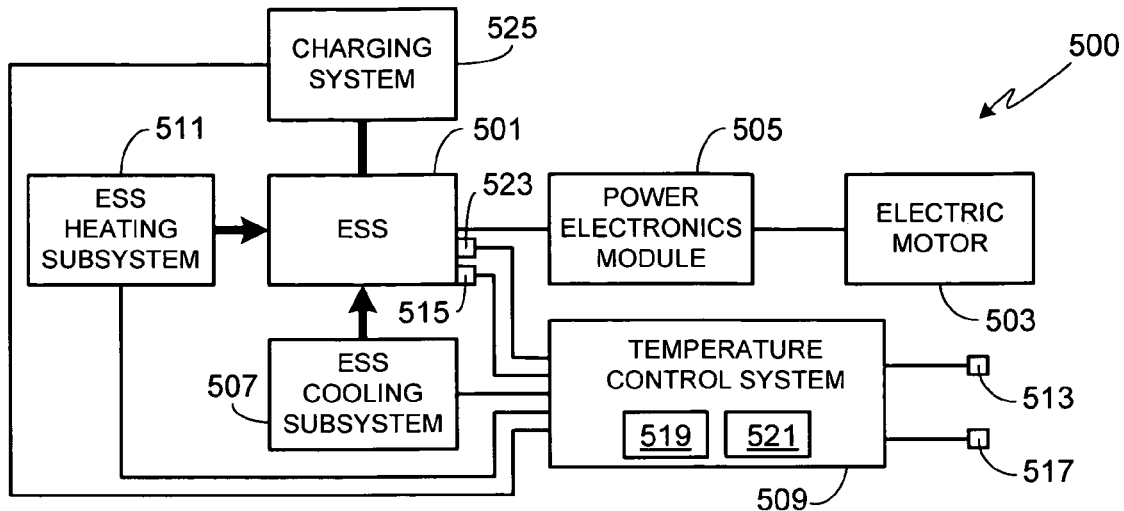
FIG. 5 is a high-level view of the primary vehicle subsystems involved in an ESS cooling system designed in accordance with a preferred embodiment of the invention.

FIG. 5 is a high-level view of the primary vehicle subsystems involved in an ESS cooling system designed in accordance with a preferred embodiment of the invention. It will be appreciated that a vehicle can utilize other system configurations while still retaining the functionality of the present invention. As shown, system 500 includes an electrical energy storage system (ESS) 501 coupled to a vehicle propulsion electric motor 503 via a power electronics module 505. In a preferred embodiment, ESS 501 is comprised of a battery pack. Motor 503 can be a single electric motor, or multiple electric motors, and be used in any type of electric vehicle, i.e., EV, HEV, or PHEV. Power electronics module 505 is used to insure that the power delivered to motor 503 has the desired voltage, current, waveform, etc. Thus, for example, power electronics module 505 typically includes a DC to AC inverter. It should be understood that the power electronics module may be comprised of passive power devices (e.g., transient filtering capacitors and/or inductors), active power devices (e.g., semiconductor and/or electromechanical switching devices, circuit protection devices, etc.), sensing devices (e.g., voltage, current, and/or power flow sensors, etc.), logic control devices, communication devices, etc. Coupled to ESS 501 is an ESS cooling subsystem 507 under the control of a temperature control system 509. In at least one embodiment, ESS cooling subsystem 507 is combined with an ESS heating subsystem 511 in a temperature management system.

In general, the allowed temperature range for ESS 501, as well as the allowed temperature variation from cell to cell within ESS 501, is greater when the car is not operating. Accordingly, in at least one preferred embodiment, the system of the invention is only implemented when the car is not running. In order to determine if the car is in the 'off' state, a vehicle condition sensor 513 monitors the condition of the car, i.e., whether the car is operating or in a stand-by mode (e.g., in storage; charging; parked with the on/off switch in the off position; etc.). Sensor 513 is coupled to temperature control system 509 and outputs a signal to system 509 indicating whether the or not the car is operating.

Temperature control system 509 monitors the temperature of ESS 501 using temperature sensor 515. Sensor 515 can use any of a variety of temperature sensing elements, e.g., thermocouples, thermisters, resistance temperature detectors (RTDs), etc. Although FIG. 5 only shows a single representative sensor 515, it should be understood that multiple sensors 515 are preferably located throughout ESS 501, thereby allowing the average temperature of ESS 501 to be determined as well as the temperature gradient between the innermost and outermost regions of the ESS. One or more temperature sensors 517 are also coupled to temperature control system 509, sensors 517 providing ambient temperature data to the system.

Figure 6:
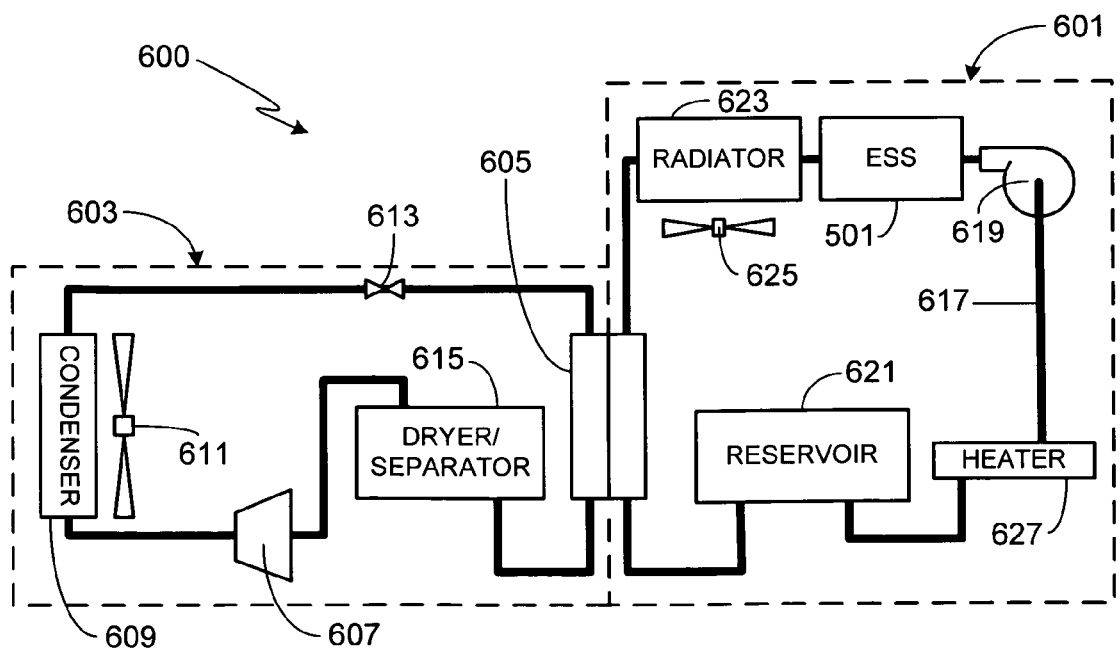
FIG. 6 schematically illustrates one embodiment of an ESS cooling system in accordance with the invention.

FIG. 6 schematically illustrates a thermal management system 600 that can be used with a preferred embodiment of the invention. The system includes the ESS cooling subsystem 601 coupled to a refrigeration subsystem 603 via a heat exchanger 605. Although not described in detail herein, it should be understood that a thermal management system for an electric vehicle will also typically includes a heating, ventilation and cooling (HVAC) subsystem as well as a powertrain cooling subsystem, for example as described in co-pending and co-assigned U.S. patent application Ser. No. 11/786,108, filed Apr. 11, 2007, the disclosure of which is incorporated herein for any and all purposes.

Preferably refrigeration subsystem 603 is a standard refrigeration subsystem as is well known by those of skill in the art. As such, refrigeration subsystem 603 is comprised of a compressor 607, condenser 609, fan 611, thermostatic expansion valve 613, dryer/separator 615, and heat exchanger 605. Compressor 607 compresses the low temperature refrigerant vapor in the subsystem into a high temperature vapor. The refrigerant vapor then dissipates a portion of the captured heat when it passes through condenser 609, thereby leading to a phase change from vapor to liquid, the liquid remaining at a high temperature and pressure. Preferably the performance of condenser 609 is enhanced by using a blower fan 611 as shown. The liquid phase refrigerant then passes through thermal expansion valve 613 which lowers both the temperature and pressure of the refrigerant as well as controlling the flow rate of refrigerant into heat exchanger 605. Heat exchanger 605 provides a simple means for transferring heat between the refrigerant contained in subsystem 603 and the coolants contained in ESS cooling subsystem 601 or in the other thermal subsystems, e.g., a HVAC or drive train cooling subsystem. After being heated in heat exchanger 605, the refrigerant is separated into the liquid and vapor phases by dryer/separator 615, thus insuring that only vapor passes through compressor 607. It should be appreciated that although refrigeration subsystem 603 is preferred, the invention can utilize other refrigeration subsystem configurations. Preferably whatever refrigeration subsystem configuration is used, it includes a heat exchanger that can be used cooperatively with the battery cooling subsystem as described herein.

ESS cooling subsystem 601 includes ESS 501 coupled to a coolant loop 617 containing a coolant, i.e., a heat transfer medium. In a typical electric vehicle, the coolant is pumped through ESS 501, for example via a heat transfer plate (not shown) coupled to the battery pack, by a circulation pump

619. As the coolant circulates through coolant loop 617, after withdrawing heat from ESS 501 the coolant is cooled via heat transfer with the refrigerant in heat exchanger 605. Preferably the battery cooling subsystem also includes a coolant reservoir 621. In order to efficiently cool the system using the ambient temperature, preferably cooling subsystem 601 also includes a radiator 623 coupled to coolant loop 617. Assuming the use of a radiator, preferably its performance is enhanced with a blower fan 625 as shown. Additionally, in at least one embodiment of the invention and as previously noted, cooling loop 617 is also thermally coupled to a heater 627 (e.g., a PTC heater), thus insuring that the temperature of ESS 501 can be maintained within its preferred operating range regardless of the ambient temperature.

It will be appreciated that there are numerous ways of controlling the amount of cooling supplied by refrigeration subsystem 603 to ESS cooling subsystem 601. Exemplary approaches include the use of valves, for example a valve within coolant loop 617 to control the flow of coolant through the ESS cooling subsystem 601 and thus the level of cooling achieved via heat exchanger 605. In an alternate exemplary approach, the speed of coolant circulation pump 619 is varied in order to control the degree of cooling achieved by the system.

Figure 7:
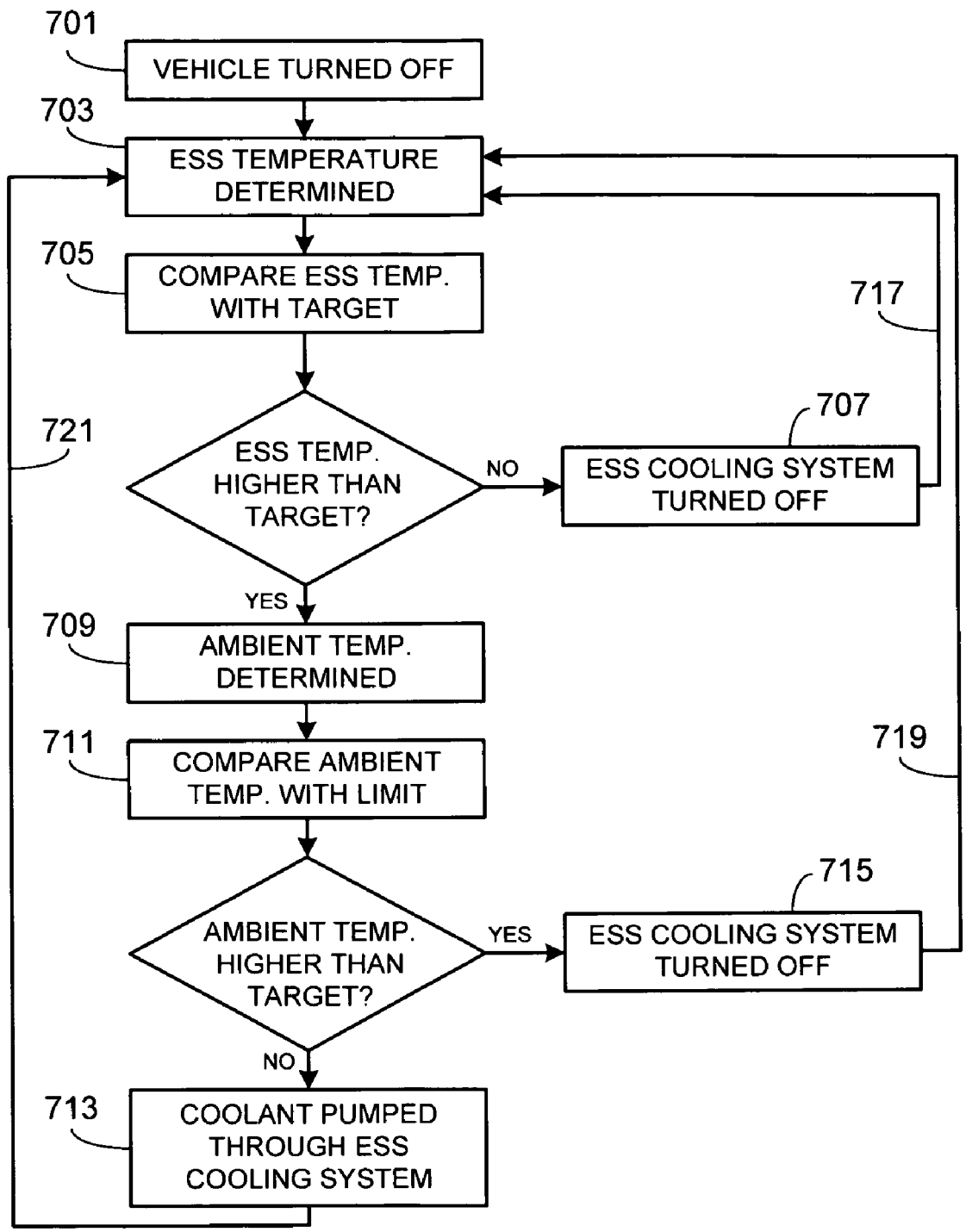
FIG. 7 illustrates the process of one preferred embodiment.

FIG. 7 illustrates the methodology of one embodiment of the invention. When the vehicle is turned off (step 701), vehicle condition monitor 513 transmits an appropriate signal to the temperature control system 509. The temperature control system 509 then determines the temperature of ESS 501, for example using temperature sensors 515 located throughout ESS 501 (step 703). Although an average temperature can be calculated based on the output from all ESS temperature sensors 515, preferably the highest monitored ESS temperature is used in determining the next stage of operation, thus insuring that all of the individual cells within the battery pack are within the desired temperature range.

After determining the ESS temperature, temperature control system 509 compares the ESS temperature with a target temperature (step 705), for example using a simple comparator circuit 519. Typically the target temperature will be set by the manufacturer of the vehicle. Preferably the target temperature is set in the range of 20° C. to 55° C.; more preferably the target temperature is set in the range of 20° C. to 40° C.; still more preferably the target temperature is set in the range of 20° C. to 30° C.; yet still more preferably the target temperature is set in the range of 20° C. to 25° C.; and yet still more preferably the target temperature is set at 20° C. If the ESS temperature is less than or equal to the target temperature, the cooling system controller 521 of the temperature control system 509 turns off the battery cooling system (step 707). If the monitored ESS temperature is greater than the target temperature, then the ambient temperature is determined using sensor 517 (step 709) and compared to a preset ambient temperature limit (step 711). In this embodiment if the ambient temperature is less than the preset ambient temperature limit, then at a minimum the cooling system controller 521 pumps coolant through coolant loop 617, ESS 501 and preferably radiator 623. If the ambient temperature is greater than the preset ambient temperature limit, then the cooling system controller 521 turns off the battery cooling system (step 715), thereby preventing coolant flow through ESS 501.

In the process illustrated in FIG. 7, when the ESS cooling system is turned off, i.e., steps 707 and 715, the system continues to monitor the ESS temperature via process loops 717 and 719. These process loops insure that the ESS temperature does not reach equilibrium at a temperature higher than desired. Similarly, when the ESS cooling system is operating, i.e., step 713, the system continues to monitor the ESS temperature via process loop 721.

It will be appreciated that in some situations, depending upon system particulars such as the thermal mass of ESS 501, the ESS target temperature used in step 705 may be higher than the preset ambient temperature limit used in step 711. For example, for the battery pack illustrated in FIG. 4, if the ESS target temperature and the ambient temperature limit were both set to 33° C., ESS cooling system operation would be initiated once curve 401 fell below 33° C. Assuming that during ESS cooling system operation only coolant circulation through loop 617 was initiated, not refrigeration system 603 operation, then coolant pumping would actually raise the temperature of ESS 501 above that achieved without coolant pumping. If, on the other hand, in this example the ambient temperature limit was set at 20° C., then ESS cooling system operation would be minimal but much more effective.

Figure 8:
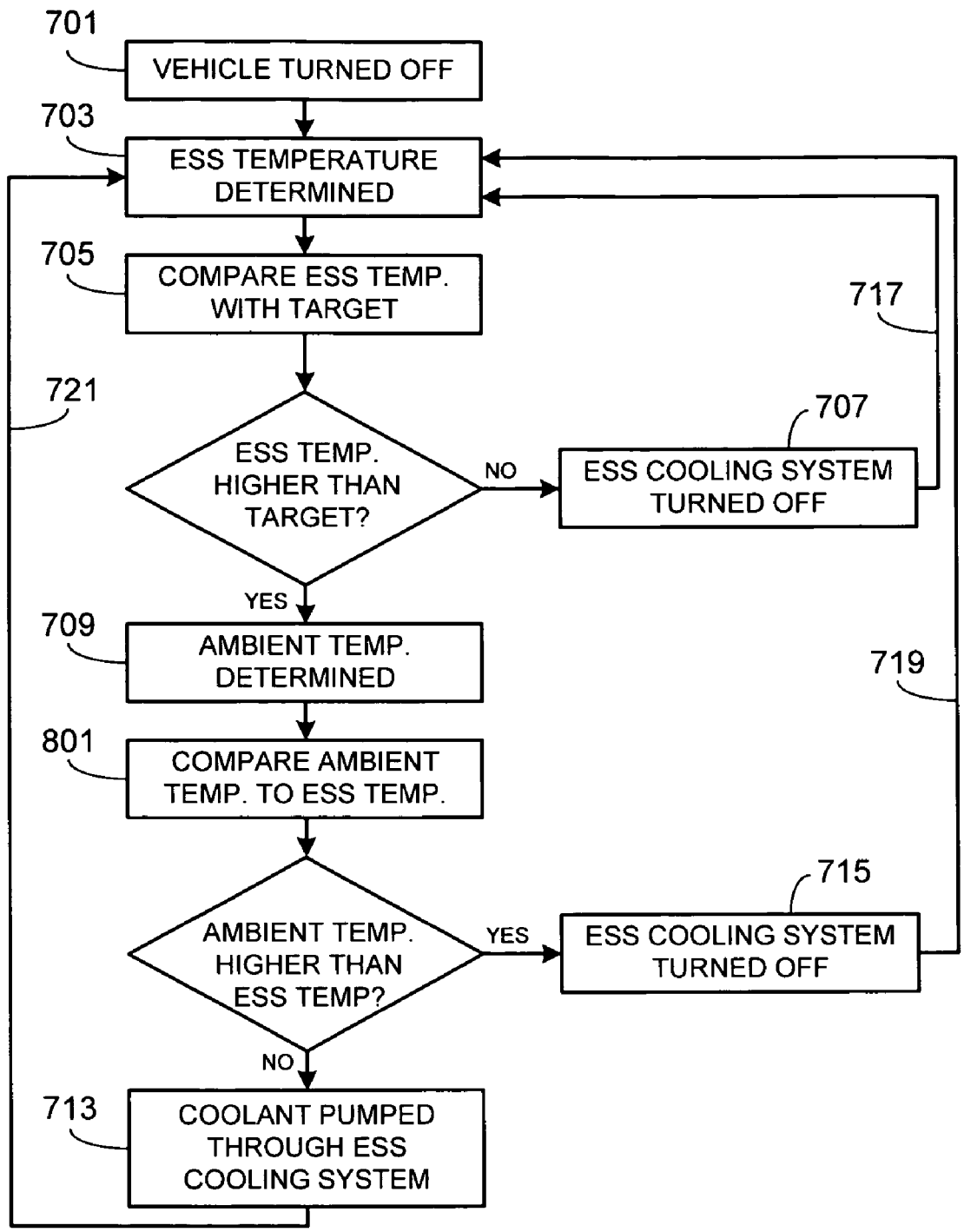
FIG. 8 illustrates a minor modification of the process illustrated in FIG. 7.

FIG. 8 illustrates a preferred modification of the process shown in FIG. 7. In this process, after the ambient temperature is determined (step 709), it is compared to the ESS temperature (step 801). If the ambient temperature is lower than the monitored ESS temperature, then coolant is circulated through coolant loop 617 (step 713), thereby lowering the temperature of ESS 501. If the ambient temperature is greater than the monitored ESS temperature, then the cooling system controller 521 turns off the ESS cooling system (step 715), thereby preventing coolant flow through ESS 501. As in the prior embodiment, process loops 717, 719 and 721 continue to monitor the ESS temperature, insuring that the ESS temperature remains within the desired temperature range.

It will be appreciated that in the preferred cooling system configuration shown in FIG. 6, there are two primary cooling subsystems. The first subsystem, and the one used in the embodiments described above, relies on coolant fluid being continuously pumped through coolant loop 617. As the coolant fluid passes through radiator 623, this subsystem can achieve adequate cooling of ESS 501 under certain circumstances, assuming that the ambient temperature is low enough as previously noted. If the ambient temperature is too high and ESS cooling is still required, secondary subsystem 603 can be activated. As previously described, subsystem 603 is a refrigeration system. Accordingly, the use of subsystem 603 in conjunction with subsystem 601 and heat exchanger 605 allows much lower ESS temperatures to be achieved and maintained.

Figure 9:
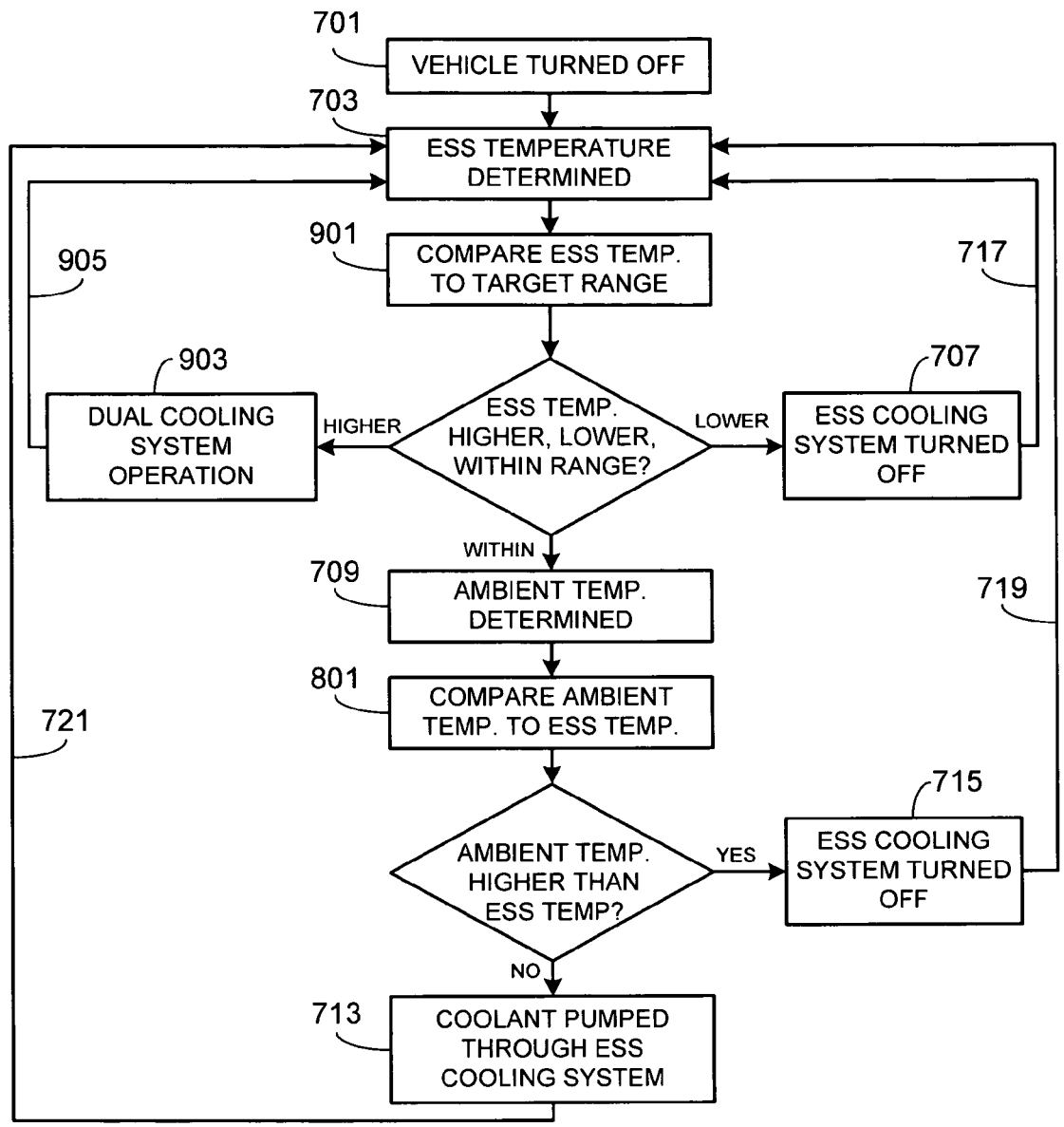
FIG. 9 illustrates an alternate process utilizing dual cooling techniques.

FIG. 9 illustrates an embodiment of the invention that takes advantage of the thermal mass of the ESS while using one or both cooling subsystems 601 and 603. As shown, after determining the ESS temperature (step 703), temperature control system 509 compares that temperature to a target temperature range (step 901). If the monitored ESS temperature is less than the target temperature range, the ESS cooling system is turned off (step 707). If the monitored ESS temperature is above the target temperature range, then temperature control system 509 initiates operation of coolant pumping through coolant loop 617 while simultaneously operating refrigeration subsystem 603 (step 903). If the monitored ESS temperature is within the target temperature range, then the ambient temperature is determined using sensor 517 (step 709) and compared to either a preset ambient temperature limit as described relative to FIG. 7, or compared to the ESS temperature as shown in FIG. 9 and described relative to FIG. 8 (step 801). If the ambient temperature is lower than the monitored ESS temperature, then coolant is circulated through coolant loop 617 (step 713), thereby lowering the temperature of ESS 501. If the ambient temperature is greater than the monitored ESS temperature, then the cooling system controller 521 turns off the ESS cooling system (step 715), thereby preventing coolant flow through ESS 501. Process loops 717, 719, 721 and 905 insure that the ESS temperature remains within the intended temperature range.

Figure 10:
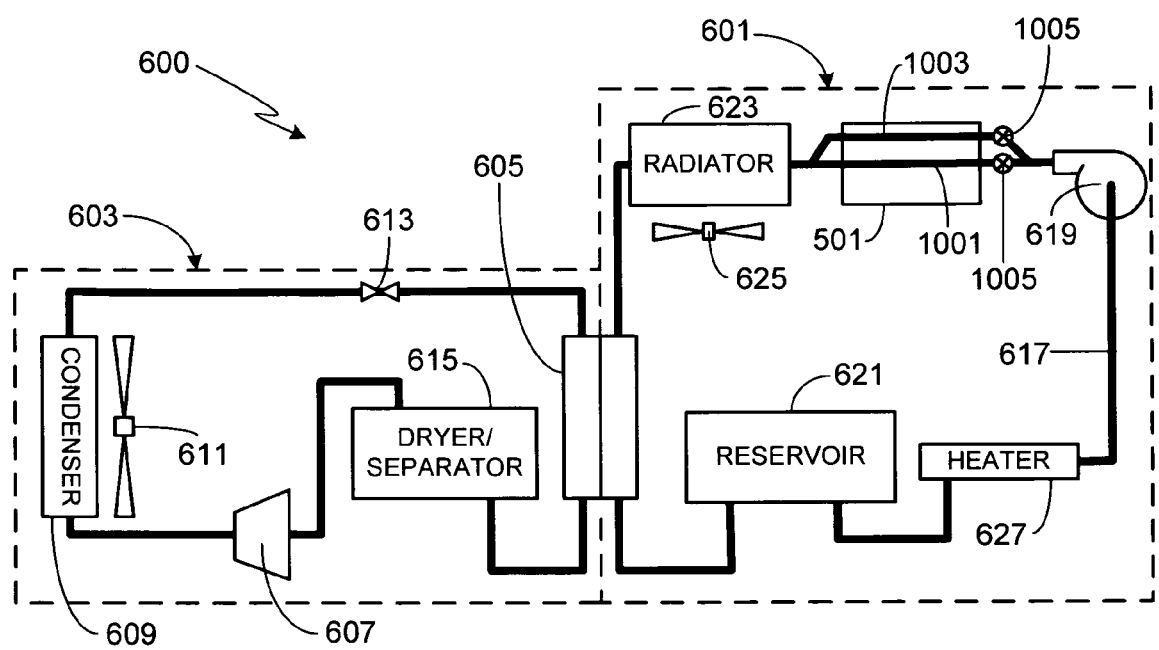
FIG. 10 schematically illustrates an embodiment of a multi-zone ESS cooling system.

In a modification of the system, and as illustrated in FIG. 10, ESS 501 includes multiple coolant conduits independently coupling multiple zones within the ESS to coolant loop 617. Although there is no limit to the number of zones that can be included within ESS 501, in at least one preferred embodiment the ESS is divided into only two zones; a core zone and a second, outer zone surrounding the core zone. In FIG. 10, the core zone is represented by cooling conduit 1001 while the outer, surrounding zone is represented by cooling conduit 1003. Although a variety of techniques can be used to control coolant flow through the various ESS zones, in at least one embodiment one or more flow valves 1005 control coolant flow, valves 1005 preferably coupled to, and controlled by, temperature control system 509.

Figure 11:
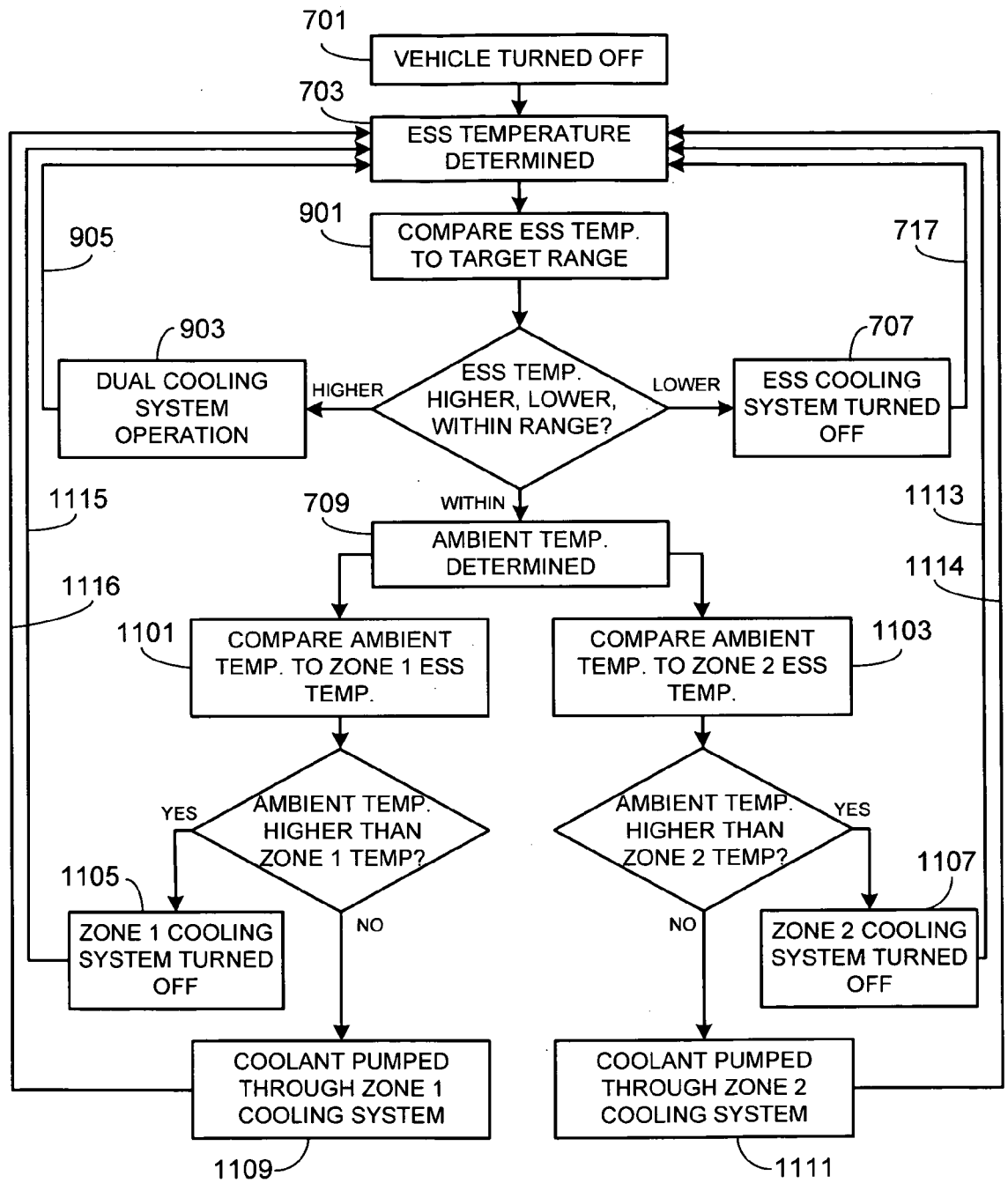
FIG. 11 illustrates a process using the multi-zone ESS cooling system shown in FIG. 10.

FIG. 11 illustrates a preferred process utilizing the multi-zone ESS cooling system described above relative to FIG. 10. It should be appreciated, however, that the multi-zone ESS cooling system can be used with any of the previously described embodiments, and FIG. 11 is only meant to illustrate the multi-zone aspect of the invention. As shown, one of the first steps, step 901, is to compare the ESS temperature to the target range. As previously noted, the ESS temperature used in this step can either be the average ESS temperature, or the highest monitored temperature. In this embodiment, if the ESS temperature is less than the target temperature range, the ESS cooling system is turned off (step 707), and if the ESS temperature is greater than the target temperature range, then temperature control system 509 initiates operation of coolant pumping through coolant loop 617 while simultaneously operating refrigeration subsystem 603 (step 903). If the ESS temperature is within the target range, then the ambient temperature is determined (step 709). Next, for each zone within ESS 501, the ESS zone temperature is compared to the ambient temperature (steps 1101 and 1103). Thus in this example, the core ESS zone temperature (e.g., zone 1 in FIG. 11) is compared to the ambient temperature in step 1101, and the outer ESS zone temperature (e.g., zone 2 in FIG. 11) is compared to the ambient temperature in step 1103. Clearly this approach can be extended to more than two ESS zones as previously noted.

For each ESS zone, if the ambient temperature is higher than the zone temperature, then the ESS cooling system for that zone is turned off, or left off if it was already off. (Steps 1105 and 1107). If the zone temperature is higher than the ambient temperature, then the ESS cooling system for that zone is turned on. (Steps 1109 and 1111). As in the prior embodiments, process loops (e.g., loops 717, 905, and 1113-1116) continue to monitor the ESS temperatures and insure that the ESS, and in this embodiment the individual ESS zones, are not allowed to increase beyond their intended temperature limits.

Figure 12:
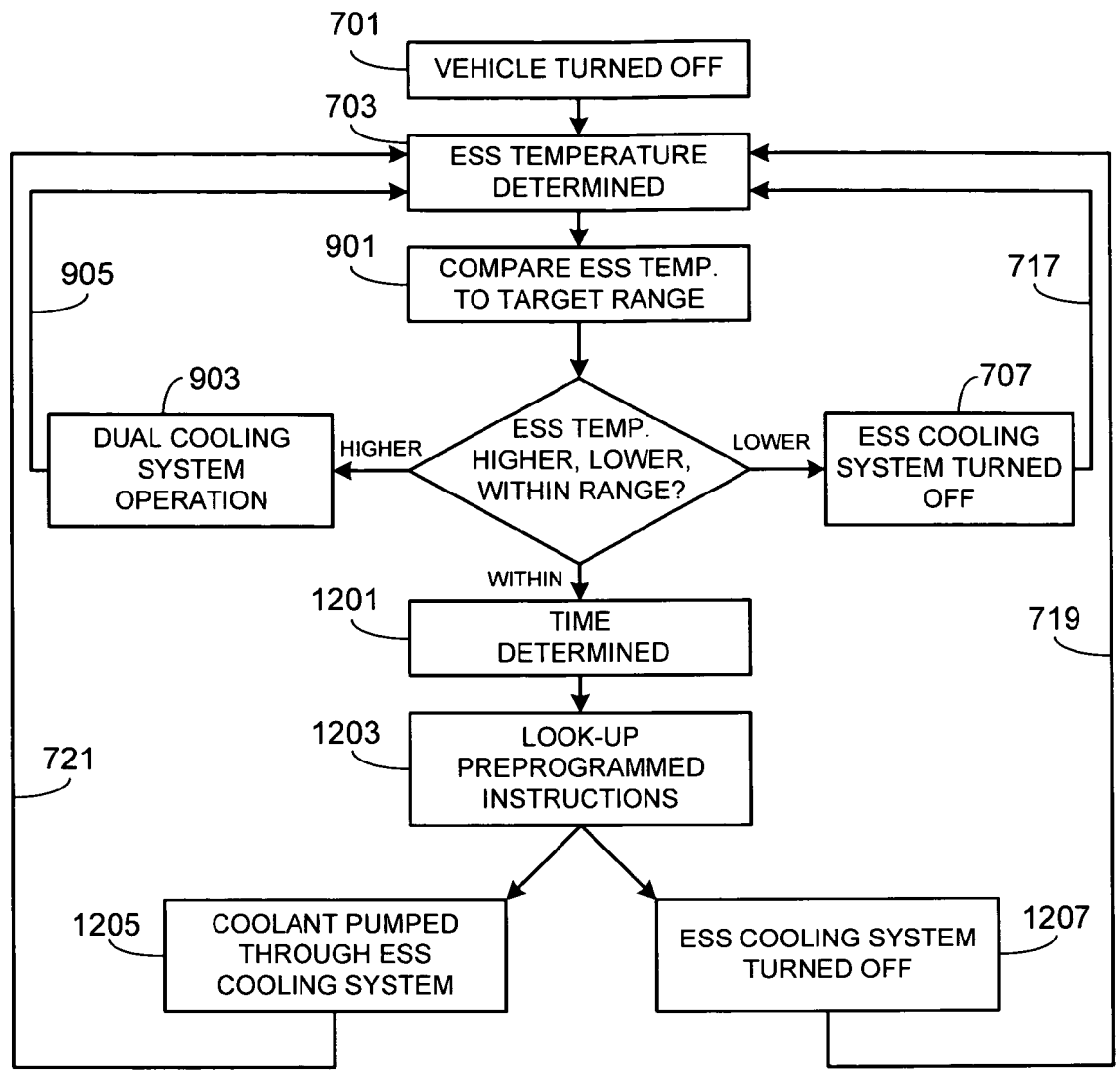
FIG. 12 illustrates an alternate process using a look-up table.
Figure 13:
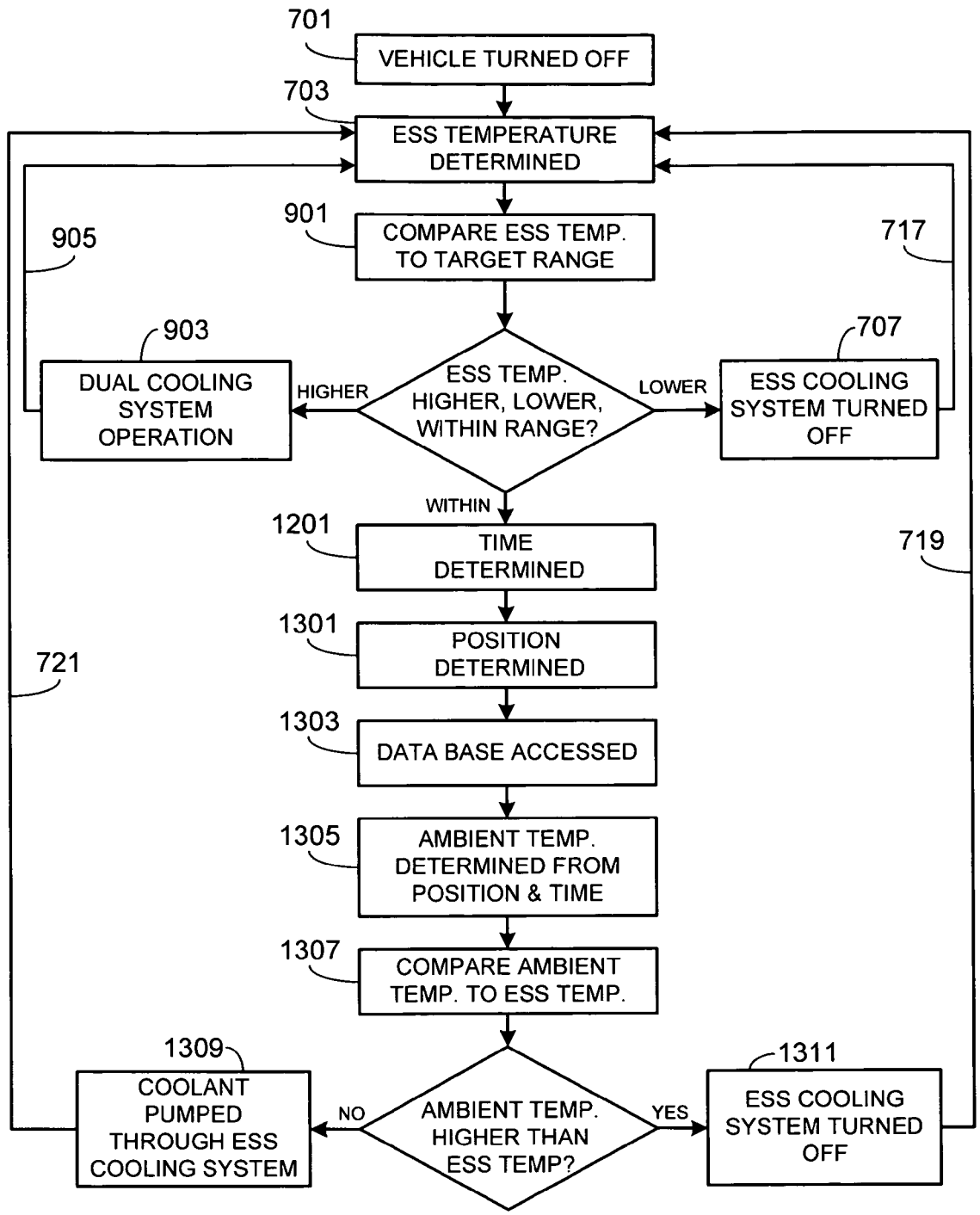
FIG. 13 illustrates an alternate process using local time and location to determine ambient temperature.

Preferably in determining whether or not to circulate coolant within the ESS, the measured ambient temperature is used as described in detail relative to the above-identified embodiments. It will be appreciated, however; that other means can be used to determine whether or not to circulate coolant through the ESS. For example, and as illustrated in FIG. 12, if it is determined that the ESS temperature is such that it may benefit from restricting the flow of coolant, then the system determines the time (step 1201), for example using an internal clock. Next, the system uses a simple look-up table (step 1203) to determine whether or not, based on the time, to circulate coolant through the ESS system (step 1205) or not (step 1207). Alternately, and as illustrated in FIG. 13, after determining the time (step 1201), the temperature control system can determine the vehicle's location, for example using an on-board global positioning system (GPS) (step 1301). Once the vehicle's location is determined and the time of day, the temperature control system accesses a data base (step 1303) in order to determine the local temperature (step 1305). The data base can be an on-board historical data base or a data base, historical or updated, accessed by the temperature control system using a network communication system. Once the local temperature is determined, either actual temperature or based on historical data, it is compared to the monitored ESS temperature (step 1307). If the ambient temperature is lower than the monitored ESS temperature, then coolant is circulated through coolant loop 617 (step 1309). If the ambient temperature is greater than the monitored ESS temperature, then the cooling system controller 521 turns off the ESS, or leaves off, the cooling system (step 1311), thereby preventing coolant flow through ESS 501. Process loops 717, 719, 721 and 905 insure that the ESS temperature remains within the intended temperature range.

In at least one embodiment, control system 509 monitors the state-of-charge (SOC) of ESS 501 with sensor 523 in order to determine whether or not to actively cool ESS 501 after the vehicle is turned off, since at low charge levels high battery temperature does not cause as much battery life degradation as it does at high charge levels. Although the additional steps associated with monitoring and using SOC data can be applied to any of the previously described processes, preferably it is added to the process previously described relative to FIG. 9, as illustrated in FIG. 14.

Figure 14:
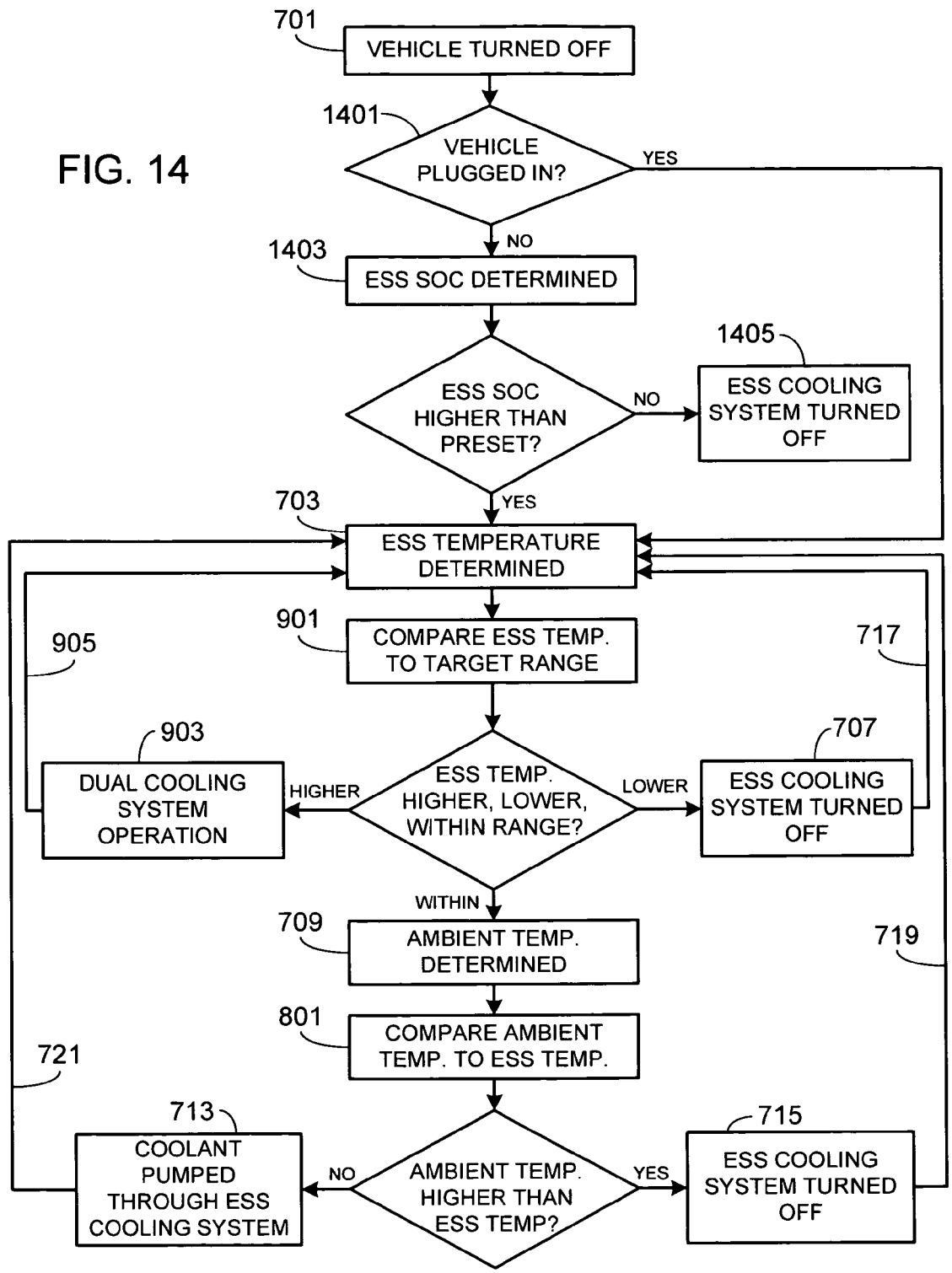
FIG. 14 illustrates an alternate process similar to that shown in FIG. 9, with the addition of ESS SOC monitoring steps.

FIG. 14 illustrates the methodology shown in FIG. 9, modified to monitor SOC. Although not required, preferably in this approach after the vehicle has been turned off (step 701), control system 509 determines if the system has been connected to an external recharging source, i.e., plugged-in (step 1401), for example by monitoring the condition of the charging system 525. If the control system determines that the system is plugged-in, in at least one embodiment the system bypasses the ESS SOC steps and goes directly to the ESS temperature determining step (step 703). If temperature control system 509 determines that the system is not plugged-in, then it determines the SOC of ESS 501 using SOC sensor 523 (step 1403). If the monitored ESS SOC is less than a preset amount, the battery cooling system is turned off (step 1405). In one embodiment, the preset target SOC is 10%; in an alternate embodiment, the target SOC is 20%; in an alternate embodiment, the target SOC is 30%. It will be appreciated that the invention is not limited to a specific preset target SOC. If the monitored ESS SOC is greater than the preset, control system 509 measures the ESS temperature (step 703) and continues performing the previously described process.

Figure 15:
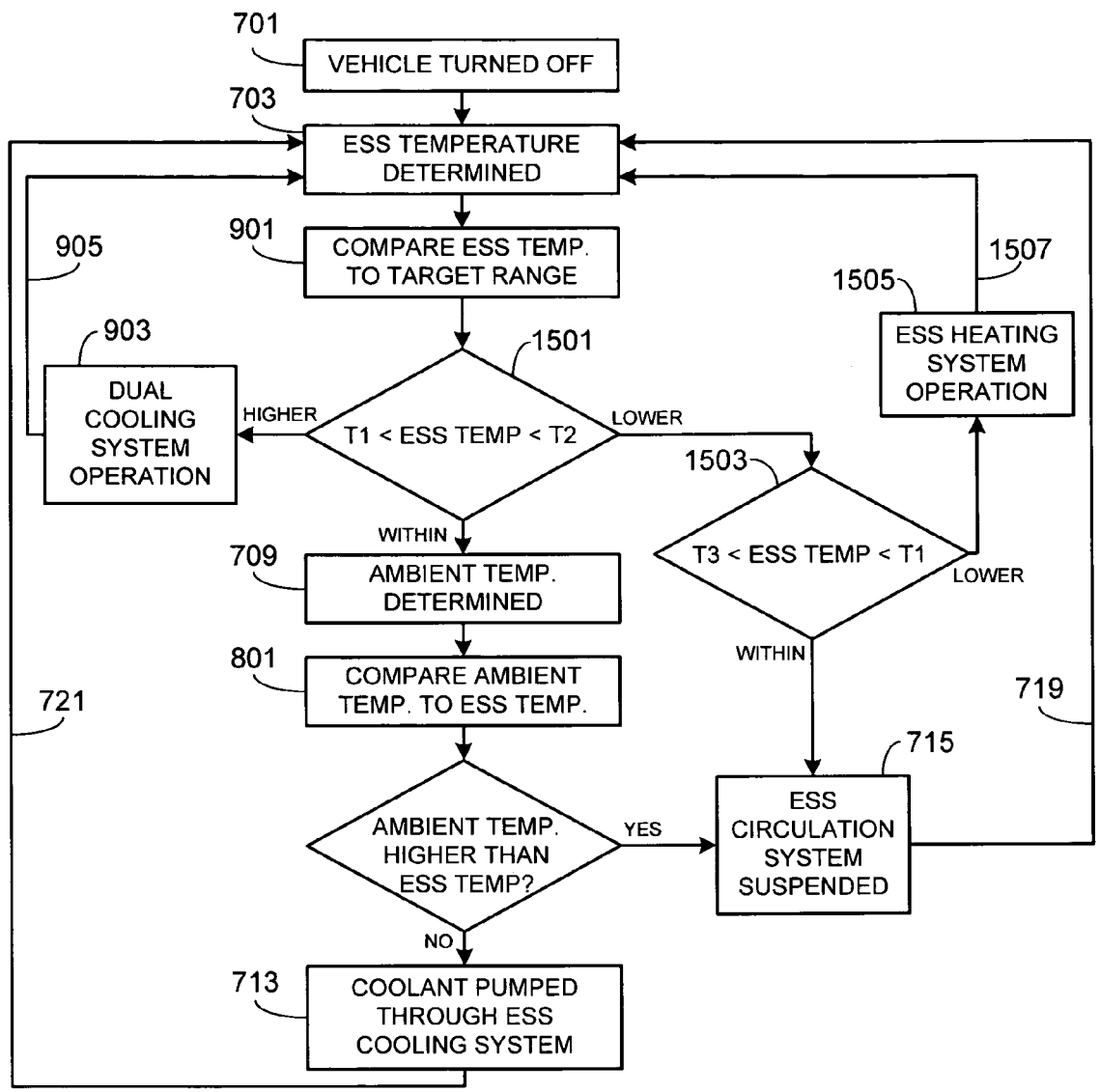
FIG. 15 illustrates an alternate process similar to that shown in FIG. 9, with the addition of limiting the lower ESS temperature.

In the embodiments described above, it is assumed that the ambient temperature, and thus the temperature of ESS 501, never falls below an acceptable storage temperature. It will be appreciated, however, that there may be circumstances in which the ambient temperature does fall below an acceptable temperature and therefore it would be desirable to limit the lower ESS storage temperature. Additionally, it may be desirable to maintain the temperature of the ESS above a certain temperature so that it may be charged, since in certain situations operation of the charging system is only permitted if the ESS is within a preset temperature range. Accordingly, in at least one preferred embodiment, the temperature of ESS 501 is not allowed to fall below a preset temperature. This aspect of the invention is illustrated in FIG. 15, which is based on the process initially described relative to FIG. 9. It should be understood, however, that any of the previously described embodiments may be modified to include the steps associated with limiting the lower ESS temperature.

As shown, after the vehicle is turned off (step 701) and the ESS temperature has been determined (step 703), temperature control system 509 compares the ESS temperature to a first target temperature range, e.g., $T_1$-$T_2$ (step 901). If the monitored ESS temperature is higher than the higher temperature limit, $T_2$, then temperature control system 509 initiates operation of coolant pumping through coolant loop 617 while simultaneously operating refrigeration subsystem 603 (step 903). If the monitored ESS temperature is within the target temperature range, i.e., between $T_1$ and $T_2$, then the ambient temperature is determined using sensor 517 (step 709) and compared to either a preset ambient temperature limit as described relative to FIG. 7, or compared to the ESS temperature as shown in this figure and described relative to FIG. 8 (step 801). If the ambient temperature is lower than the monitored ESS temperature, then coolant is circulated through coolant loop 617 (step 713), thereby lowering the temperature of ESS 501. If the ambient temperature is greater than the monitored ESS temperature, then the cooling system controller turns off the ESS coolant circulation system (step 715).

In this embodiment, if at step 1501 the monitored ESS temperature is lower than the lower temperature limit, $T_1$, then temperature control system 509 compares the ESS temperature to a second target temperature range, e.g., $T_3$-$T_1$ (step 1503). If the monitored ESS temperature is lower than the lower temperature limit, $T_3$, then temperature control system 509 initiates operation of initiates operation of coolant pumping through coolant loop 617 while simultaneously operating heater 627 (step 1505). If the monitored ESS temperature is within the second target temperature range, i.e., between $T_3$ and $T_1$, then the cooling system controller turns off the ESS coolant circulation system (step 715). Process loops 719, 721, 905 and 1507 insure that the ESS temperature remains within the intended temperature range.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A thermal management system for an electric vehicle comprising:
   an electrical energy storage system (ESS) coupled to an electric vehicle powertrain, said electrical ESS supplying power to an electric motor of said electric vehicle powertrain;
   a cooling system comprised of a coolant within a coolant loop, said coolant loop in thermal communication with said electrical ESS, said coolant system further comprised of a coolant pump for pumping said coolant through said coolant loop, said coolant system further comprised of a radiator coupled to said coolant loop, wherein said coolant passes through said radiator as said coolant is pumped through said coolant loop with said coolant pump;
   a temperature control system coupled to said cooling system, wherein said cooling system is under the control of said temperature control system, wherein said temperature control system further comprises:
      a vehicle condition monitor, wherein said vehicle condition monitor outputs a first condition signal when said electric vehicle is on and outputs a second condition signal when said electric vehicle is off;
      an ambient temperature monitor for determining ambient temperature;
      a comparator circuit for comparing said ambient temperature with a preset temperature, wherein said comparator circuit outputs a first signal when said ambient temperature is less than said preset temperature and outputs a second signal when said ambient temperature is greater than said preset temperature; and
      a cooling system controller coupled to said cooling system, said cooling system controller configured to output a control signal to said cooling system when said vehicle condition monitor outputs said second condition signal, said cooling system controller further configured to receive said first and second signals from said comparator circuit, wherein said control signal activates said coolant pump when said cooling system controller receives said first signal from said comparator circuit, and wherein said control signal deactivates said coolant pump when said cooling system controller receives said second signal from said comparator circuit.

2. The thermal management system of claim 1, further comprising at least one temperature sensor in thermal communication with said electrical ESS, said at least one temperature sensor monitoring an ESS temperature, wherein said preset temperature is set to said ESS temperature.

3. The thermal management system of claim 1, further comprising:
   at least one temperature sensor in thermal communication with said electrical ESS, said at least one temperature sensor monitoring an ESS temperature; and
   a second comparator circuit for comparing said ESS temperature with a preset ESS target temperature, wherein said second comparator circuit outputs a cooling system deactivation signal to said cooling system controller when said ESS temperature is less than said preset ESS target temperature, and wherein said control signal from said cooling system controller deactivates said coolant pump when said cooling system controller receives said cooling system deactivation signal from said second comparator circuit.

4. The thermal management system of claim 3, wherein said preset temperature is set to said ESS temperature.

5. The thermal management system of claim 1, further comprising:
   a refrigeration system independent of said cooling system;
   a heat exchanger in thermal communication with said refrigeration system and in thermal communication with said cooling system via said coolant loop;
   at least one temperature sensor in thermal communication with said electrical ESS, said at least one temperature sensor monitoring an ESS temperature; and
   a second comparator circuit for comparing said ESS temperature with a preset ESS target temperature range, wherein said second comparator circuit outputs a first cooling system command signal to said cooling system controller when said ESS temperature is lower than said preset ESS target temperature range, wherein said second comparator circuit outputs a second cooling system command signal to said cooling system controller when said ESS temperature is within said preset ESS target temperature range, and wherein said second comparator circuit outputs a third cooling system command signal to said cooling system controller when said ESS temperature is greater than said preset ESS target temperature range; and wherein said control signal from said cooling system controller deactivates said coolant pump and said refrigeration system when said cooling system controller receives said first cooling system command signal from said second comparator circuit, and wherein said control signal from said cooling system controller activates said coolant pump and said refrigeration system when said cooling system controller receives said third cooling system command signal from said second comparator circuit.

6. The thermal management system of claim 5, wherein said preset temperature is set to said ESS temperature.

7. The thermal management system of claim 1, further comprising:
at least one temperature sensor in thermal communication with said electrical ESS, said at least one temperature sensor monitoring an ESS temperature; and
a second comparator circuit for comparing said ESS temperature with a preset ESS target temperature range, wherein said second comparator circuit outputs a third signal when said ESS temperature is lower than said preset ESS target temperature range, and wherein said second comparator circuit outputs a fourth signal when said ESS temperature is within said preset ESS target temperature range;
a heater coupled to said coolant loop, wherein said cooling system controller is coupled to said heater, wherein said cooling system controller is further configured to receive said third and fourth signals from said second comparator circuit; and
wherein said control signal from said cooling system controller activates said coolant pump and activates said heater when said cooling system controller receives said third signal from said second comparator circuit, and wherein said control signal from said cooling system controller deactivates said coolant pump when said cooling system controller receives said fourth signal from said second comparator circuit.

8. The thermal management system of claim 1, further comprising:
a refrigeration system independent of said cooling system;
a heat exchanger in thermal communication with said refrigeration system and in thermal communication with said cooling system via said coolant loop;
at least one temperature sensor in thermal communication with said electrical ESS, said at least one temperature sensor monitoring an ESS temperature; and
a second comparator circuit for comparing said ESS temperature with a first preset ESS target temperature range, wherein said second comparator circuit outputs a third signal when said ESS temperature is higher than said first preset ESS target temperature range, wherein said ESS temperature is compared with a second preset ESS target temperature range by a third comparator circuit when said ESS temperature is lower than said first preset ESS target temperature range, wherein said third comparator circuit outputs a fourth signal when said ESS temperature is lower than said second preset ESS target temperature range, and wherein said third comparator circuit outputs a fifth signal when said ESS temperature is lower than said second preset ESS target temperature range;
a heater coupled to said coolant loop, wherein said cooling system controller is coupled to said heater, wherein said cooling system controller is further configured to receive said third signal from said second comparator circuit and configured to receive said fourth and fifth signals from said third comparator circuit; and
wherein said control signal from said cooling system controller activates said coolant pump and said refrigeration system when said cooling system controller receives said third signal from said second comparator circuit, wherein said control signal from said cooling system controller activates said coolant pump and activates said heater when said cooling system controller receives said fourth signal from said third comparator circuit, and wherein said control signal from said cooling system controller deactivates said coolant pump when said cooling system controller receives said fifth signal from said third comparator circuit.

9. The thermal management system of claim 1, further comprising a state of charge (SOC) sensor coupled to said electrical ESS and to said temperature control system, said SOC sensor monitoring a current SOC of said electrical ESS, wherein said cooling system controller is configured to output a deactivation signal to said cooling system when said current SOC is less than a preset target SOC.

10. The thermal management system of claim 1, wherein said ambient temperature monitor is comprised of an ambient temperature sensor.

11. The thermal management system of claim 1, wherein said ambient temperature monitor is further comprised of:
a clock for providing local time;
a global positioning system for determining vehicle location; and
means for accessing a data base, said data base providing temperature data as a function of local time and said vehicle location.

12. A thermal management system for an electric vehicle comprising:
an electrical energy storage system (ESS) coupled to an electric vehicle powertrain, said electrical ESS supplying power to an electric motor of said electric vehicle powertrain;
a cooling system comprising:
a coolant within a coolant loop, wherein a first portion of said coolant loop is in thermal communication with a first section of said electrical ESS and a second portion of said coolant loop is in thermal communication with a second section of said electrical ESS;
a coolant pump for pumping said coolant through said coolant loop;
a first valve for controlling flow through said first portion of said coolant loop;
a second valve for controlling flow through said second portion of said coolant loop; and
a radiator coupled to said coolant loop, wherein said coolant passes through said radiator as said coolant is pumped through said coolant loop with said coolant pump;
at least one temperature sensor in thermal communication with said first section of said electrical ESS and monitoring a first section ESS temperature;
at least one temperature sensor in thermal communication with said second section of said electrical ESS and monitoring a second section ESS temperature;
a temperature control system coupled to said cooling system, wherein said cooling system is under the control of said temperature control system, wherein said temperature control system further comprises:

a vehicle condition monitor, wherein said vehicle condition monitor outputs a first condition signal when said electric vehicle is on and outputs a second condition signal when said electric vehicle is off;

an ambient temperature monitor for determining ambient temperature;

a first comparator circuit for comparing said ambient temperature with said first section ESS temperature, wherein said first comparator circuit outputs a first signal when said ambient temperature is less than said first section ESS temperature and outputs a second signal when said ambient temperature is greater than said first section ESS temperature;

a second comparator circuit for comparing said ambient temperature with said second section ESS temperature, wherein said second comparator circuit outputs a third signal when said ambient temperature is less than said second section ESS temperature and outputs a fourth signal when said ambient temperature is greater than said second section ESS temperature; and a cooling system controller coupled to said cooling system, said cooling system controller configured to output a control signal to said cooling system when said vehicle condition monitor outputs said second condition signal, said cooling system controller further configured to receive said first and second signals from said first comparator circuit and said third and fourth signals from said second comparator circuit, wherein said control signal activates said coolant pump and opens said first valve when said cooling system controller receives said first signal from said first comparator circuit, wherein said control signal activates said coolant pump and opens said second valve when said cooling system controller receives said third signal from said second comparator circuit, wherein said control signal deactivates said coolant pump when said cooling system controller receives said second signal from said first comparator circuit, and wherein said control signal deactivates said coolant pump when said cooling system controller receives said fourth signal from said second comparator circuit.

13. The thermal management system of claim 12, further comprising:

a refrigeration system independent of said cooling system;

a heat exchanger in thermal communication with said refrigeration system and in thermal communication with said cooling system via said coolant loop;

a third comparator circuit for comparing said first section ESS temperature with a preset ESS target temperature range, wherein said third comparator circuit outputs a first cooling system command signal to said cooling system controller when said first section ESS temperature is lower than said preset ESS target temperature range, wherein said third comparator circuit outputs a second cooling system command signal to said cooling system controller when said first section ESS temperature is within said preset ESS target temperature range, and wherein said third comparator circuit outputs a third cooling system command signal to said cooling system controller when said first section ESS temperature is greater than said preset ESS target temperature range; and wherein said control signal from said cooling system controller deactivates said coolant pump and said refrigeration system when said cooling system controller receives said first cooling system command signal from said third comparator circuit, and wherein said control signal from said cooling system controller activates said coolant pump and said refrigeration system and opens said first valve when said cooling system controller receives said third cooling system command signal from said third comparator circuit.

* * * * *